455-612 AU 233 EX

FIP8106 OR 3,657,544

United States Patent [15] 3,657,544

Schöldström [45] Apr. 18, 1972

[54] SCRAMBLED-PHASE LIGHT SIGNALLING DEVICE

[72] Inventor: Karl O. R. Schöldström, Lidingo, Sweden

[73] Assignee: AGA Aktiebolag, Lidingo, Sweden

[22] Filed: Nov. 12, 1969

[21] Appl. No.: 875,633

[30] Foreign Application Priority Data

Nov. 15, 1968 Sweden ....................15499/68

[52] U.S. Cl. ....................250/199, 250/216, 250/227, 331/94.5, 350/96 B

[51] Int. Cl. ....................H04b 9/00

[58] Field of Search ....................178/DIG. 2; 210/199; 250/227, 250/216, 199; 313/105; 331/94.5; 350/96 B

[56] References Cited

UNITED STATES PATENTS

| | | | |
|---|---|---|---|
| 2,884,542 | 4/1959 | Schöldström | 313/105 |
| 3,134,840 | 5/1964 | Gamo | 250/199 |
| 3,244,894 | 4/1966 | Steele et al. | 250/227 |
| 3,331,651 | 7/1967 | Sterzer | 250/199 |
| 3,467,858 | 9/1969 | Burnett | 250/199 |
| 3,493,760 | 2/1970 | Hoadley | 250/199 |

*Primary Examiner*—Robert L. Griffin
*Assistant Examiner*—Albert J. Mayer
*Attorney*—Larson, Taylor and Hinds

[57] ABSTRACT

A corrective device is provided for modulated light transmitters or receivers having light-emitting or light-responsive surfaces for which the modulation phase varies over the surface. The device eliminates any systematic error which may occur where only a portion of the surface is active by providing random reorientation of the transmitted or received light beam, the device taking the form of a multi-path translator wherein light conductors connect points on the input surface of the translator to randomly distributed points on the output surface.

6 Claims, 4 Drawing Figures

PATENTED APR 18 1972 3,657,544

INVENTOR
KARL O. R. SCHÖLDSTRÖM

BY Larson and Taylor
ATTORNEYS

SCRAMBLED-PHASE LIGHT SIGNALLING DEVICE

BACKGROUND OF THE INVENTION

Transmitters for modulated light of the type having a light-emitting surface, such as luminescent diodes and Kerr cells, respond differently to the impressed modulation over different portions of the surface. Specifically, the impressed modulation may cause different portions of the surface to respond with different amounts of delay so that the light signal emitted by the transmitter includes a phase variation over the surface. This phase variation may cause a systematic error in signalling arrangements wherein the phase of the transmitted signal is of importance, such as an arrangement in which distance is measured based on a comparison of phase between a transmitted and a received signal. Errors of this type will not always average out and where, for example, the receiver responds to only a portion of the emitted signal corresponding to a particular area of the emitting surface, the error may affect the measurement produced.

Similar problems may occur for receivers having a light-responsive surface. For example, a well known receiver of this type is the photo-multiplier tube wherein electrons released from different points along the surface of the cathode will have different transit times through the various stages of the tube. Receivers of this type are thus prone to errors such as discussed hereinabove.

One solution to the problems caused by light sensitive surfaces which produce different delays over the surface area is described in U.S. Pat. No. 2,884,542 wherein only portions of the surface having approximately the same transit time are utilized. This solution, of course, dictates that other portions of the surface are not utilized and may place severe limitations on the instruments in which the transmitter or receiver is used.

SUMMARY OF THE INVENTION

In accordance with the present invention, a solution is provided to the problems caused by light sensitive surfaces which provide different delays over the surface area, which enables the utilization of the entire light-emitting or light-receiving surface.

In accordance with the presently preferred embodiment of the invention a multi-path light translator is inserted in the path of the transmitted or received beam of light, the translator including a plurality of light conductors connecting points on the input surface thereof to differently located points on the output surface thereof so as to provide a "scrambling" of the input light. This scrambling of the light produces a random rearrangement or reorientation of the surface distribution of the light and thus eliminates any systematic errors which may otherwise occur because only a section of the emitting or receiving surface is being used. The light translator preferably comprises a group of optically conductive fibers in a scrambled or random arrangement.

Other features and advantages of the present invention will be set forth in or apparent from the detailed description of preferred embodiments of the invention found here and below.

DESCRIPTION OF THE PREFERRED EMBODIMENTS

Figures 1, 2:
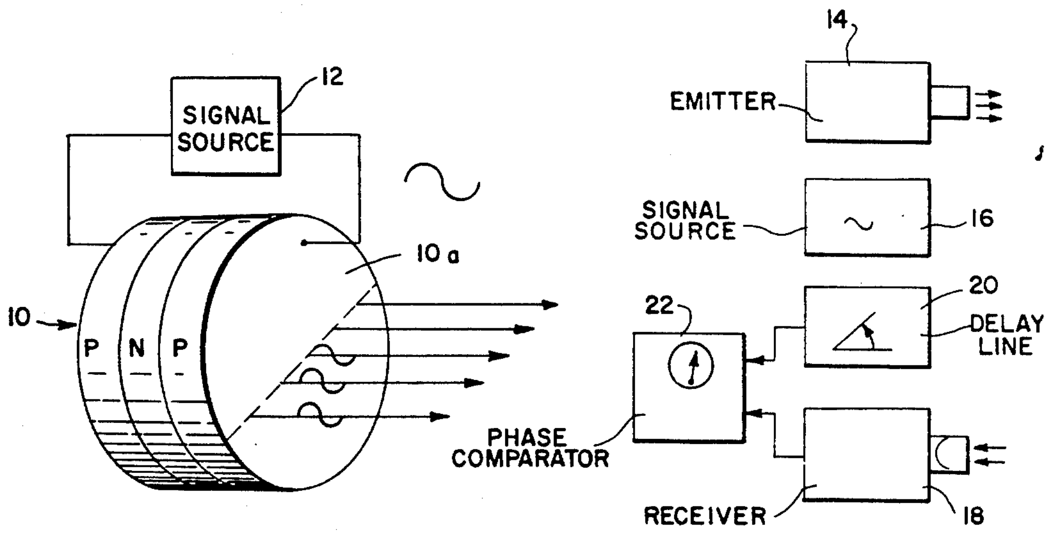
FIG. 1 is a schematic representation of a modulated luminescent diode illustrating the phase delay provided thereby.
FIG. 2 is a schematic circuit diagram of one type of rangefinder in which the present invention may be incorporated.

Referring to FIG. 1, a conventional modulatable light transmitter in a form of a PNP semi-conductor configuration denoted 10 is shown connected to a modulation signal source 12. Source 12 applies a sinusoidal voltage to light transmitter 10 in a known manner to cause modulated light to be emitted from the surface **10*a* of the light transmitter 10. Because of inherent capacitances and resistances, the excitation of the light emitting surface 10*a* is not precisely simultaneous over the entire surface area and thus various elemental portions of the surface 10*a* emit light oscillations having different phases, as is indicated schematically in FIG. 1. In FIG. 1, the phase distribution over the surface 10*a* of light transmitter 10 is arbitrarily assumed, and by way of example only, to correspond to a gradually increasing delay towards the center of the surface 10*a***. It is noted that a similar delay phenomenon may exist at the output side of a Kerr cell under circumstances where the liquid in the space between the electrodes is not entirely homogeneous.

Referring to FIG. 2, a block diagram is shown of a conventional rangefinder in which the invention may be utilized. The instrument of FIG. 2 comprises a transmitter 14 which emits a beam of light toward a distant reflector (not shown) and a receiver 18 which receives reflected light returning from the reflector. A modulation signal source 16 serves in controlling the strength of the light signal emitted by the transmitter 14. The output of signal source 16 is also applied to a delay line 20 which is connected to a first input of a phase comparator 22, the second input of phase comparator 22 being connected to the output of receiver 18. Delay line 20 is adjustable and, in operation, is adjusted until a zero reading is obtained for phase comparator 20 thus indicating that the delay over the path traveled by the light beam is equal to the delay provided by the delay line 20. The rangefinder instrument of FIG. 2 is conventional in construction and operation and hence further description thereof is deemed unnecessary.

It will be appreciated from the foregoing discussion that where a light transmitter corresponding to transmitter 10 of FIG. 1 is used as the light transmitter 14 of FIG. 2, the phase of the modulated light beam will vary over the cross-section thereof. Because the phase comparator 22 responds to the average phase of the received signal, the measurement produced will be based on averaging of the entire beam and the error resulting from the phase variation may not be substantial. However, in actual practice it is very often impossible to determine whether the receiver is responding to light from the entire surface of a transmitter in that the emitted beam is often spread to a cross-section which is larger than the cross-section of the reflector. Hence it may be impossible to ascertain what portion of the light emitting surface of the transmitter is being responded to at the reflector. Where the reflector is responding to less than the entire surface of the receiver, a systematic error in phase will be produced which is not compensated for by any averaging that may take place in the receiver or in the phase comparator.

Figure 3:
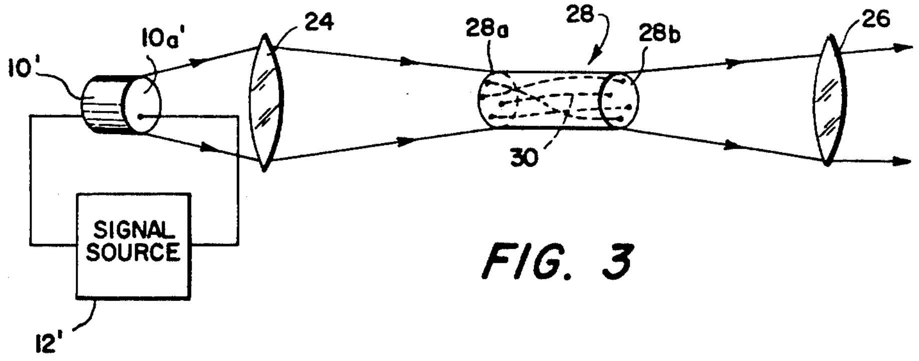
FIG. 3 is a schematic diagram of a modulatable light signalling device incorporating a multi-path translator in accordance with the invention.

Referring to FIG. 3, a light transmitter 10′ of the type shown in FIG. 1 is connected to a modulation signal source 12′ and incorporated in a system in accordance with the present invention. The light emitted from light transmitter 10′ is directed by means of a lens 24 to a multi-path light translator 28 and from translator 28 to a second lens 26 from which the light beam is transmitted.

Multi-path translator 28 is, in the embodiment illustrated in FIG. 3, of cylindrical shape and includes an input surface **28*a* which receives light from the light transmitter 10′ and output surface 28*b* from which the light beam is emitted. It is noted that translator 28 does not have to be cylindrical in shape and in some instances it may be preferable to employ a translator wherein one of the two surfaces is of a larger diameter than the other. To provide a random distribution of light, a number of points on surface 28*a* are connected to differently located or oriented points on surface 28*b* by light conductors 30. Light conductors 30 are preferably fiber glass conductors which extend between surfaces 28*a* and 28*b* but are randomly oriented or "scrambled" relative to one another so that the light arriving at surface 28*b*** will be randomly distributed relative to the light falling on surface 28*a*. The net effect of the random distribution of the light conductors and the random orientation of the points on surface 28*b* relative to those on surface 28*a* is that the light in a particular area of output surface 28*b* is transmitted from all parts of the input surface 28*a* and thus any phase delays contributable to a particular area of the light falling on surface 28*a* will be substantially "averaged out" at surface 28*b*. It will be apparent from the foregoing that by utilizing a translator such as translator 28 of FIG. 3, in the transmitter 14 of FIG. 2, the light arriving at the receiver 18 will be made up of light from all parts of the light emitting surface of the transmitter 14 and thus systematic errors such as discussed hereinabove will be eliminated.

Figure 4:
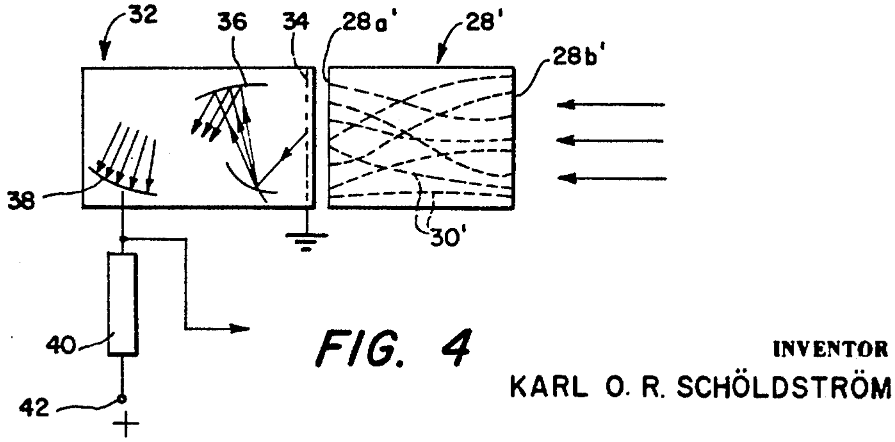
FIG. 4 is a schematic diagram of a light receiver incorporating a multi-path translator in accordance with the invention.

Referring to FIG. 4, the invention is shown as incorporated in a light receiver in the form of a photo-multiplier tube 32. Photo-multiplier 32 includes a cathode 34, a plurality of dynodes (one of which denoted 36 is shown), and an anode 38 which is connected through an anode load resister 40 to a source of positive potential denoted 42. In a conventional photo-multiplier tube, such as photo-multiplier 32, the transit time for the electron current to travel from the cathode 34 to the anode 38 is dependent upon the portion of the cathode 34 at which the electron current originates. Thus for the rangefinder and distance measuring instruments of the type shown in FIG. 2 difficulties may be encountered when only a portion of the cathode surface provides the predominate response of the receiver. Under these circumstances a systematic error may be introduced which will not be removed in the averaging process discussed above. In accordance with the invention, a multi-path light translator 28′ corresponding to translator 28 of FIG. 3 discussed here and above, is placed in front of photo-sensitive cathode 34 and serves to scramble the received light and to thus cause the light to be distributed over the whole cathode surface irrespective of the distribution of the light falling on input surface 28*b*′. It will be appreciated that the use of translator 28′ does not, of course, remove the differences in transit time for electrons from different portion of the cathode surface but rather eliminates the dependency of the response of the receiver on the location of the beam on surface 28*b*′ (which, of course, would be the location of the beam on cathode 34 were not for the presence of the translator 28′). The use of translator 28′ also eliminates the effects of a non-homogeneous distribution of light within the beam itself. Such a non-homogeneous distribution may arise during the transit of the beam from the reflector through contact of the beam with obstacles in the path of the beam.

Although the present invention has been described with reference to preferred embodiments thereof, it will be understood by those skilled in the art that various and modifications in these embodiments can be effected within the scope and spirit of the invention.

I claim:

1. A modulatable light signalling device comprising: a modulation signal source for producing a modulating signal; a light transmitter coupled to said source for emitting light in accordance with said modulating signal, said light transmitter including a light-emitting surface which tends to produce a light output which varies in phase over said surface; optical beam-forming means responsive to said light transmitter for forming the light receiver means for receiving the transmitted light output thereof into a beam of light; and means, located in the optical path between said beam-forming means and receiver means having an input surface and an output surface, for randomly varying the orientation of the light received on said output surface so that the light emitted from said output surface is oriented differently from the light received on said input surface thereby phase averaging the phase of the light received by the receiver means.

2. A device as claimed in claim 1 wherein the last-mentioned means comprises a multi-path light translator including a plurality of light conductors connecting points of the input surface with points at different relative locations on said output surface.

3. A device as claimed in claim 2 wherein said light translator comprises a group of randomly oriented optically conductive fibers.

4. In a system including a transmitter and a receiver for modulated light said receiver including a photomultiplier tube having a light responsive surface which tends to produce an output which varies in phase over said surface, the improvement comprising a multi-path light translator positioned between the transmitter and receiver, having an input surface for receiving light and an output surface for transmitting light to the light-responsive surface of the receiver, for randomly varying the orientation of the light transmitted from the transmitter to the input surface of the photomultiplier tube, thereby averaging the light received across the input surface of the photomultiplier tube so as to average the phase delays within the phototube at the output of said phototube the input surface.

5. A receiver as claimed in claim 4 wherein said multi-light translator comprises a plurality of light conductors connecting points of the input surface with points at different relative locations on the output surface.

6. A device as claimed in claim 5 wherein said light translator comprises a group of randomly oriented optically conductive fibers.

* * * * *